United States Patent
Wu et al.

(10) Patent No.: US 9,736,864 B2
(45) Date of Patent: Aug. 15, 2017

(54) DEVICE AND METHOD OF HANDLING SYSTEM INFORMATION

(71) Applicant: HTC Corporation, Taoyuan (TW)

(72) Inventors: Chih-Hsiang Wu, Taoyuan (TW); Te-Ming Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/150,436

(22) Filed: May 10, 2016

(65) Prior Publication Data

US 2016/0338113 A1   Nov. 17, 2016

Related U.S. Application Data

(60) Provisional application No. 62/159,949, filed on May 11, 2015.

(51) Int. Cl.
| | |
|---|---|
| *H04W 72/00* | (2009.01) |
| *H04W 74/08* | (2009.01) |
| *H04W 48/08* | (2009.01) |
| *H04W 72/04* | (2009.01) |
| *H04W 48/16* | (2009.01) |
| H04W 48/06 | (2009.01) |

(52) U.S. Cl.
CPC ....... *H04W 74/0833* (2013.01); *H04W 48/08* (2013.01); *H04W 48/16* (2013.01); *H04W 72/042* (2013.01); H04W 48/06 (2013.01)

(58) Field of Classification Search
None
See application file for complete search history.

(56) References Cited

U.S. PATENT DOCUMENTS

| | | |
|---|---|---|
| 2014/0098761 A1 | 4/2014 | Lee |
| 2016/0242206 A1* | 8/2016 | Ohlsson ............ H04W 72/1231 |

OTHER PUBLICATIONS

Search Report mailed/issued on Sep. 26, 2016 for EP application No. 16168861.9, pp. 1-12.
ZTE, "Considerations on new SIB(s) for MTC enhancement", 3GPP TSG RAN WG2 Meeting #89, R2-150478, Feb. 9-13, 2015, Athens, Greece, XP050935730, pp. 1-6.
CATT, "Open issues on SIB for LC-MTC", 3GPP TSG RAN WG2 Meeting #89bis, R2-151209, Apr. 20-24, 2015, Bratislava, Slovakia, XP050936169, pp. 1-7.

(Continued)

*Primary Examiner* — Erika Washington
(74) *Attorney, Agent, or Firm* — Winston Hsu

(57) ABSTRACT

A communication device for handling system information comprises a storage unit for storing instructions and a processing means coupled to the storage unit. The processing means is configured to execute the instructions stored in the storage unit. The instructions comprise receiving at least one legacy system information block (SIB) including at least one first configuration in a cell; receiving at least one enhanced coverage (EC) SIB including at least one second configuration in the cell; and applying the at least one second configuration instead of the at least one first configuration, when the communication device is a low complexity communication device or is configured to apply the at least one EC SIB instead of the at least one legacy SIB wherein the at least one first configuration and the at least one second configuration are transmitted for a same communication function.

14 Claims, 5 Drawing Sheets

(56) References Cited

OTHER PUBLICATIONS

Intel Corporation, "System information for Release-13 low complexity UEs and enhanced coverage", 3GPP TSG RAN WG2 Meeting #89bis, R2-151106, Apr. 20-24, 2015, Bratislava, Slovakia, XP050936087, pp. 1-8.
3GPP TSG-RAN WG2 Meeting #90, R2-151742, Fukuoka, Japan, May 25-29, 2015.
3GPP TSG RAN WG2 #89bis, R2-151001, Apr. 20 to May 24, 2015, Bratislava, Slovakia, Apr. 2015.
3GPP TSG-RAN2 Meeting #89bis, R2-151635, Bratislava, Slovakia, Apr. 20-24, 2015.
3GPP TSG-RAN WG2 Meeting #89bis, R2-151666, Bratislava, Slovakia, Apr. 20-24, 2015.
3GPP TSG RAN WG2 Meeting #89bis, R2-151209, Bratislava, Slovakia, Apr. 20-24, 2015.
ETSI TS 136 304 v12.4.0 (Apr. 2015) (3GPP TS 36.304 version 12.4.0 Release 12).
ETSI TS 136 331 v12.5.0 (Apr. 2015) (3GPP TS 36.331 version 12.5.0 Release 12).

* cited by examiner

DEVICE AND METHOD OF HANDLING SYSTEM INFORMATION

CROSS REFERENCE TO RELATED APPLICATIONS

This application claims the benefit of U.S. Provisional Application No. 62/159,949, filed on May 11, 2015, which is incorporated herein by reference.

BACKGROUND OF THE INVENTION

1. Field of the Invention

The present invention relates to a communication device and a method used in a wireless communication system, and more particularly, to a communication device and a method of handling system information in a wireless communication system.

2. Description of the Prior Art

A long-term evolution (LTE) system includes a radio interface that provides high data rate, low latency, packet optimization, and improved system capacity and coverage, between communication between a user equipment (UE), and an evolved Node-B (eNB).

The UE may receive different system information blocks (SIBs) from a cell of the eNB when camping on the cell, wherein the SIBs may include different configurations, respectively. However, the configurations may be used for a same communication function. The UE does not know which of the configurations should be applied to the communication function, after the UE receives these different SIBs. Thus, how to handle system information transmitted by the cell is a problem to be solved.

SUMMARY OF THE INVENTION

The present invention therefore provides a communication device and a method for handling system information to solve the abovementioned problem.

A communication device for handling system information comprises a storage unit for storing instructions and a processing means coupled to the storage unit. The processing means is configured to execute the instructions stored in the storage unit. The instructions comprise receiving at least one legacy system information block (SIB) including at least one first configuration in a cell; receiving at least one enhanced coverage (EC) SIB including at least one second configuration in the cell; and applying the at least one second configuration instead of the at least one first configuration, when the communication device is a low complexity communication device or is configured to apply the at least one EC SIB instead of the at least one legacy SIB, wherein the at least one first configuration and the at least one second configuration are transmitted for a same communication function.

A communication device for handling system information comprises a storage unit for storing instructions and a processing means coupled to the storage unit. The processing means is configured to execute the instructions stored in the storage unit. The instructions comprise receiving at least one legacy SIB including at least one first configuration in a cell; receiving at least one EC SIB including at least one second configuration in the cell; and applying the at least one first configuration instead of the at least one second configuration, when the communication device is not a low complexity communication device, wherein the at least one first configuration and the at least one second configuration are transmitted for a same communication function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
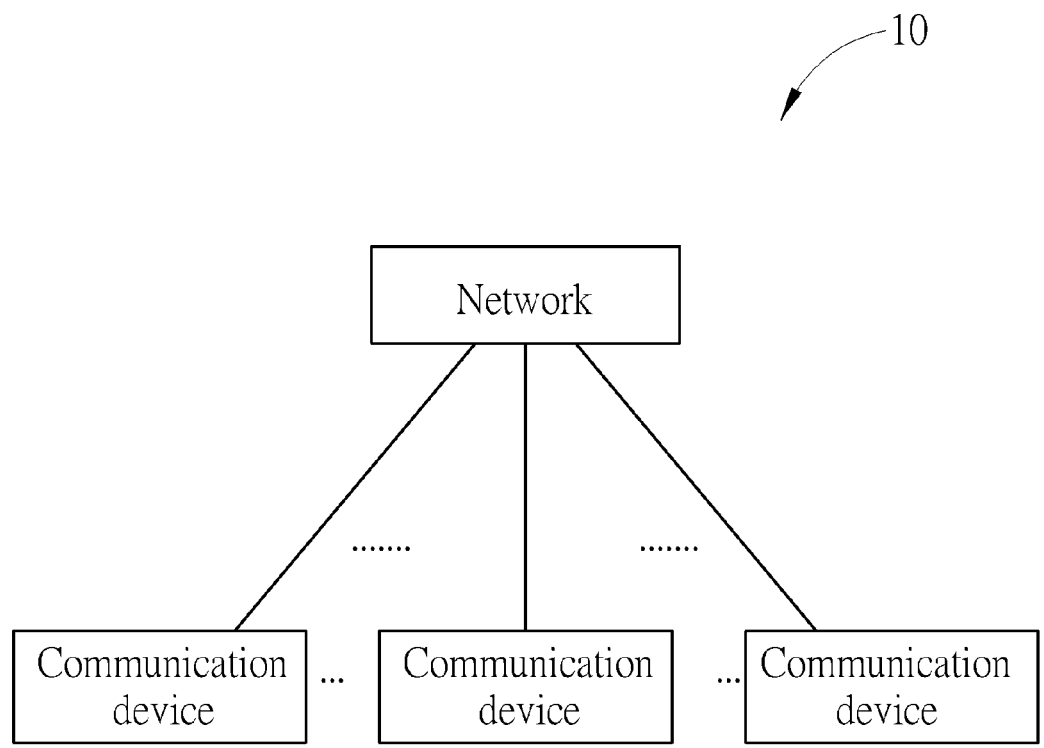
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) comprising at least one Node-B (NB) and/or a Radio Network Controller (RNC) in a universal mobile telecommunications system (UMTS). In one example, the network may be an evolved UTRAN (E-UTRAN) comprising at least one evolved NB (eNB) and/or at least one relay in a long term evolution (LTE) system, a LTE-Advanced (LTE-A) system or an evolution of the LTE-A system. In another example, the network may be a fifth generation (5G) network including at least one 5G base station (BS) which employs orthogonal frequency-division multiplexing (OFDM) and/or non-OFDM, and transmission time interval smaller than 1 millisecond (ms) for communication with the communication devices. In general, a base station (BS) may also be used to refer any of the NB, the RNC, the eNB and the 5G BS.

A communication device can be a user equipment (UE), a low cost device (e.g., machine type communication (MTC) device), a mobile phone, a laptop, a tablet computer, an electronic book, a portable computer system, a vehicle or aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
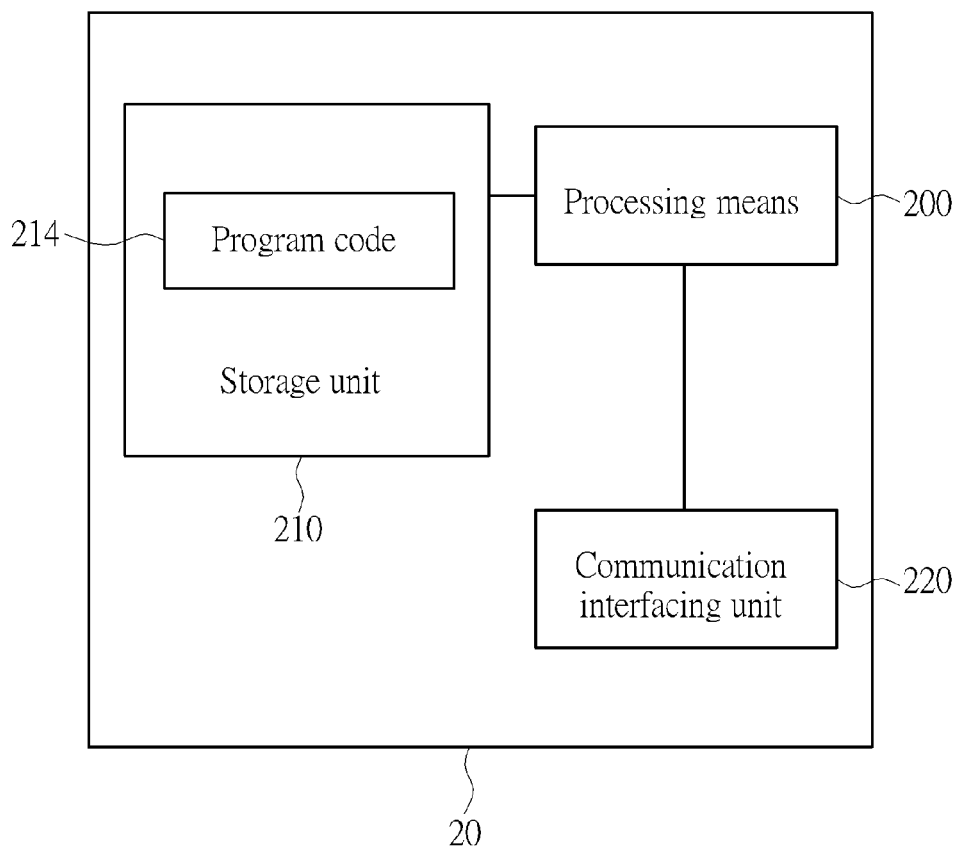
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200. For simplicity, the UE is used to represent the communication device in FIG. 1 in the following examples.

Figure 3:
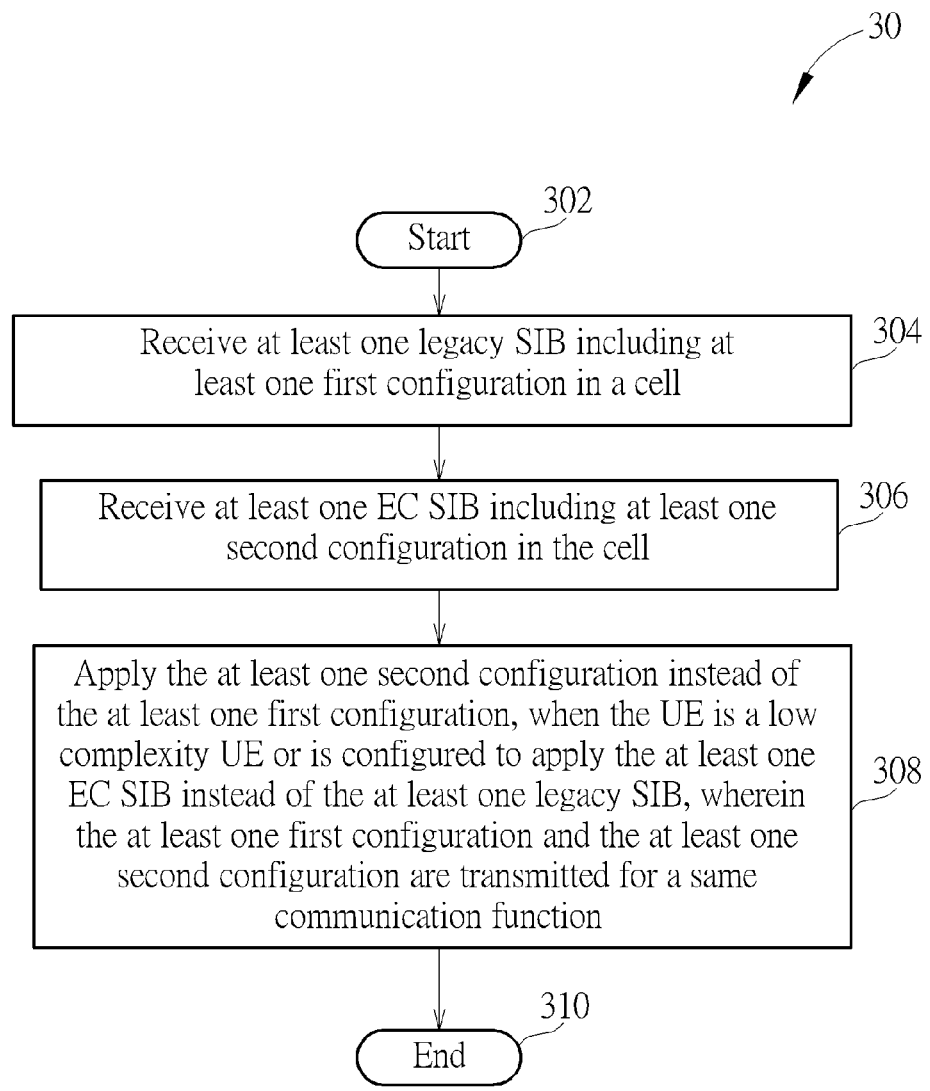
FIG. 3 is a flowchart of a process according to an example of the present invention.

FIG. 3 is a flowchart of process 30 according to an example of the present invention. The process 30 may be utilized in a UE of FIG. 1, to handle system information. The process 30 includes the following steps:

Step 302: Start.

Step 304: Receive at least one legacy system information block (SIB) including at least one first configuration in a cell.

Step 306: Receive at least one enhanced coverage (EC) SIB including at least one second configuration in the cell.

Step 308: Apply the at least one second configuration instead of the at least one first configuration, when the UE is a low complexity UE or is configured to apply the at least one EC SIB instead of the at least one legacy SIB, wherein the at least one first configuration and the at least one second configuration are transmitted for a same communication function.

Step 310: End.

According to the process 30, the UE receives at least one legacy SIB (e.g., SIB type 1 (SIB1) and/or SIB type 2 (SIB2)) including at least one first configuration, in a cell from a network. The UE receives at least one EC SIB including at least one second configuration, in the cell from the network. Then, the UE applies the at least one second configuration instead of the at least one first configuration, when the UE is a low complexity UE or is configured to apply the at least one EC SIB instead of the at least one legacy SIB, wherein the at least one first and second configurations are transmitted by the network on the cell for a same communication function (or functionality). That is, the UE applies (e.g., uses) the at least one second configuration to the communication function, when the UE is the low complexity UE or is configured to apply the at least one EC SIB.

Realization of the present invention is not limited to the above description. The following examples may be applied to the process 30.

In one example, the at least one first configuration may include at least one first cell barred information, and the at least one second configuration may include at least one second cell barred information. The UE determines that the cell is barred, when the at least one second cell barred information (e.g., cellBarred information element (IE)) indicates that the cell is barred irrespective of the at least one first cell barred information (e.g., cellBarred IE) indicates that the cell is barred or not. For example, the UE determines that the cell is barred, when the at least one first cell barred information indicates that the cell is not barred and the at least one second cell barred information indicates that the cell is barred. In one example, the UE determines that the cell is not barred, when the at least one second cell barred information indicates that the cell is not barred irrespective of that the at least one first cell barred information indicates that the cell is barred or not.

In one example, the at least one first configuration may include at least one first access barring configuration, and the at least one second configuration may include at least one second access barring configuration. In one example, the UE applies the at least one second access barring configuration by performing a barring check for a specific access according to the at least one second access barring configuration, wherein the at least one first access barring configuration does not configure a access barring for the specific access and the at least one second access barring configuration configures the access barring for the specific access. In one example, the UE applies the at least one second access barring configuration by stopping performing a barring check for a specific access according to the at least one second access barring configuration, wherein the at least one first access barring configuration configures a access barring for the specific access and the at least second access barring configuration does not configure the access barring for the specific access.

In one example, the at least one first configuration may include at least one first random access (RA) configuration, and the at least one second configuration may include at least one second RA configuration. In one example, the UE applies the at least one second RA configuration by performing a RA according to the at least one second RA configuration instead of the at least one first RA configuration.

In one example, the UE applies the at least one second configuration instead of the at least one first configuration, when determining the at least one legacy SIB as invalid. The UE may determine the at least one legacy SIB as invalid, when the UE does not receive the at least one legacy SIB in or after a first time period (e.g., a predetermined time period, or one or more first modification periods). For example, the UE receives the at least one legacy SIB in every first time period. After a while, the UE is not able to receive the at least one legacy SIB but is able to receive the at least one EC SIB. Then, the UE starts a first timer to count the first time period. The UE restarts or stops the first timer when the UE receives the at least one legacy SIB. The UE determines the at least one legacy SIB as invalid, when the first timer expires. In one example, the UE determines the at least one legacy SIB as invalid or configures itself to apply the at least one EC SIB, if signal strength measured by the UE is below a threshold. Otherwise, the UE configures itself to apply the at least one legacy SIB.

Figure 4:
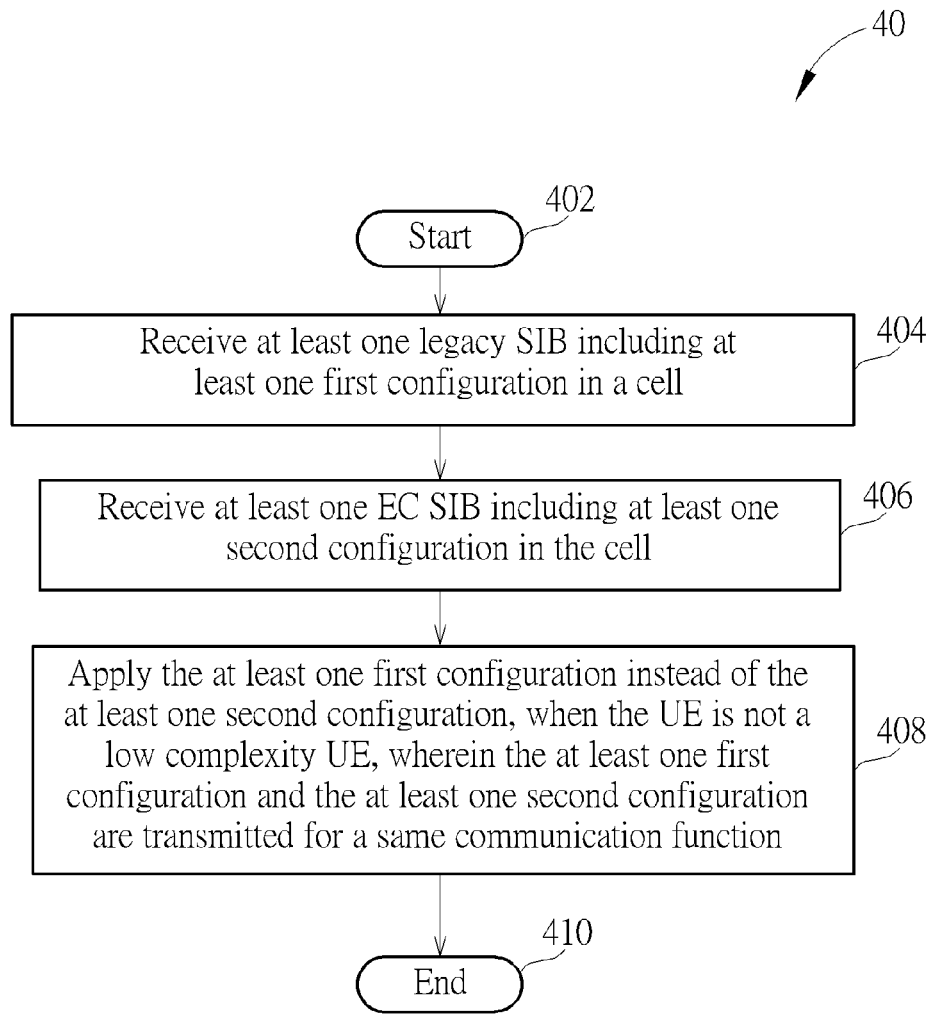
FIG. 4 is a flowchart of a process according to an example of the present invention.

FIG. 4 is a flowchart of process 40 according to an example of the present invention. The process 40 may be utilized in a UE of FIG. 1, to handle system information. The process 40 and includes the following steps:

Step 402: Start.

Step 404: Receive at least one legacy SIB including at least one first configuration in a cell.

Step 406: Receive at least one EC SIB including at least one second configuration in the cell.

Step 408: Apply the at least one first configuration instead of the at least one second configuration, when the UE is not a low complexity UE, wherein the at least one first configuration and the at least one second configuration are transmitted for a same communication function.

Step 410: End.

According to the process 40, the UE receives at least one legacy SIB (e.g., SIB1 and/or SIB2) including at least one first configuration, in a cell from the network. The UE receives at least one EC SIB including at least one second configuration, in the cell from the network. Then, the UE applies the at least one first configuration instead of the at least one second configuration, when the UE is not a low complexity UE, and the at least one first and second configurations are transmitted by the network for a same communication function (or functionality). That is, the UE applies (e.g., uses) the at least one first configuration to the communication function, when the UE is not the low complexity UE.

Realization of the present invention is not limited to the above description. The following examples may be applied to the process 40.

In one example, the at least one first configuration in the process 40 may include at least one first cell barred information, and the at least one second configuration may include at least one second cell barred information. The UE determines that the cell is barred, when the at least one first cell barred information (e.g., cellBarred IE) indicates that the cell is barred irrespective of the at least one second cell barred information (e.g., cellBarred IE) indicates that the cell is barred or not. For example, the UE determines that the cell is barred, when the at least one first cell barred information indicates that the cell is barred and the at least one second cell barred information indicates that the cell is not barred. In one example, the UE determines that the cell is not barred, when the at least one first cell barred information indicates that the cell is not barred irrespective of that the at least one second cell barred information indicates that the cell is barred or not.

In one example, the at least one first configuration may include at least one first access barring configuration, and the at least one second configuration may include at least one second access barring configuration. In one example, the UE applies the at least one first access barring configuration by performing a barring check for a specific access according to the at least one first access barring configuration, wherein the at least one second access barring configuration does not configure a access barring for the specific access and the at least one first access barring configuration configures the access barring for the specific access. In one example, the UE applies the at least one first access barring configuration by stopping performing a barring check for a specific access according to the at least one first access barring configuration, wherein the at least one second access barring configuration configures a access barring for the specific access and the at least one first access barring configuration does not configure the access barring for the specific access.

In one example, the at least one first configuration may include at least one first RA configuration, and the at least one second configuration may include at least one second RA configuration. In one example, the UE applies the at least one first RA configuration by performing a RA according to the at least one first RA configuration instead of the at least one second RA configuration.

In one example, the UE applies the at least one first configuration instead of the at least one second configuration, when determining the at least one EC SIB as invalid. The UE may determine the at least one EC SIB as invalid, when the UE does not receive the at least one EC SIB in or after a second time period (e.g., a predetermined time period, or one or more second modification periods). For example, the UE receives the at least one EC SIB in second every time period. After a while, the UE is not able to receive the at least one EC SIB but is able to receive the at least one legacy SIB. Then, the UE starts a second timer to count the second time period. The UE restarts or stops the second timer when the UE receives the at least one EC SIB. The UE determines the at least one EC SIB as invalid, when the second timer expires. In one example, the UE determines the at least one EC SIB as invalid or configures itself to apply the at least one legacy SIB, if signal strength measured by the UE is above a threshold.

Figure 5:
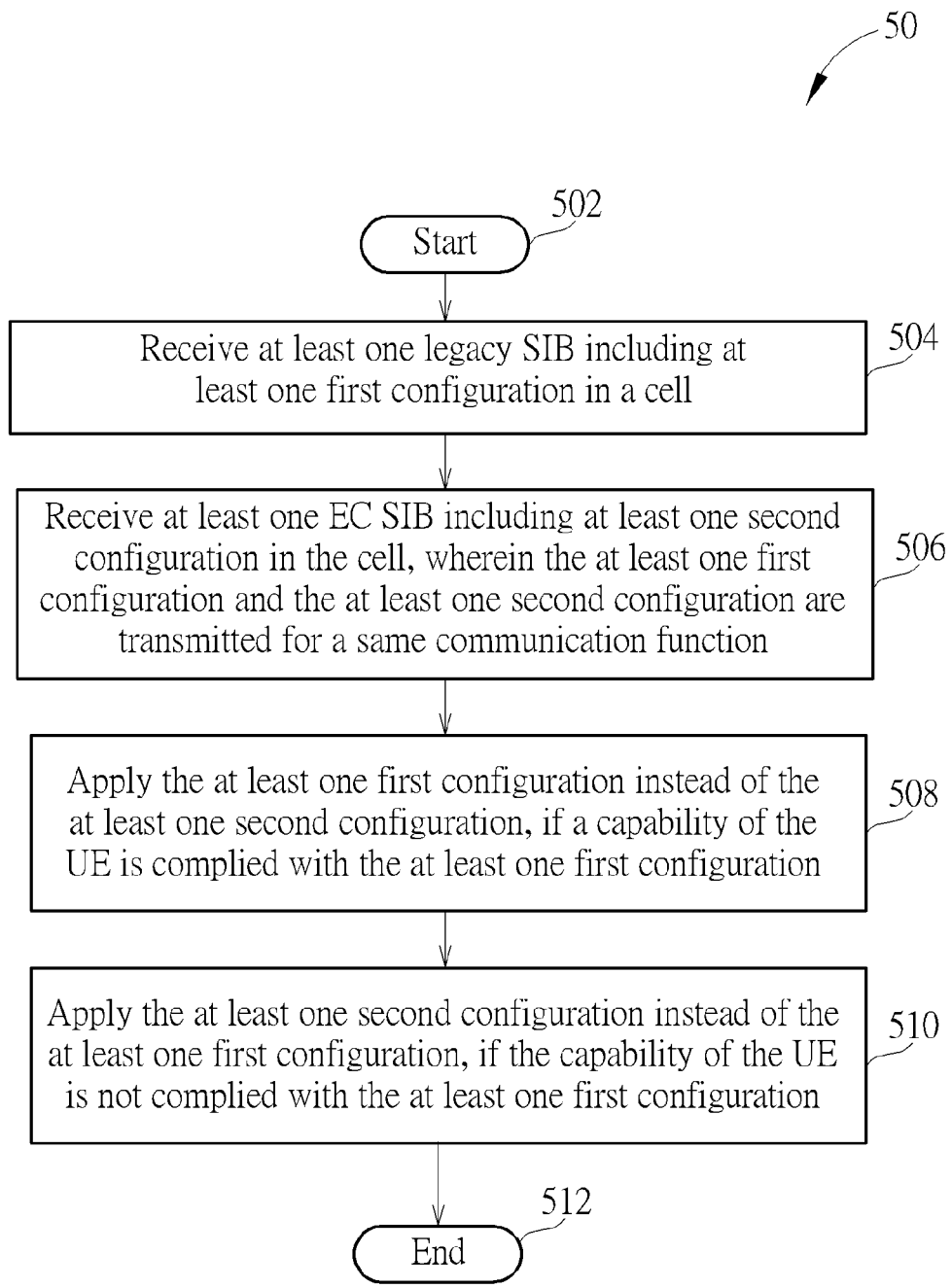
FIG. 5 is a flowchart of a process according to an example of the present invention.

FIG. 5 is a flowchart of process 50 according to an example of the present invention. The process 50 may be utilized in a UE of FIG. 1, to handle system information. The process 50 includes the following steps:

Step 502: Start.

Step 504: Receive at least one legacy SIB including at least one first configuration in a cell.

Step 506: Receive at least one EC SIB including at least one second configuration in the cell, wherein the at least one first configuration and the at least one second configuration are transmitted for a same communication function.

Step 508: Apply the at least one first configuration instead of the at least one second configuration, if a capability of the UE is complied with the at least one first configuration.

Step 510: Apply the at least one second configuration instead of the at least one first configuration, if the capability of the UE is not complied with the at least one first configuration.

Step 512: End.

According to the process 50, the UE receives at least one legacy SIB (e.g., SIB1 and/or SIB2) including at least one first configuration in a cell. The UE receives at least one EC SIB including at least one second configuration in the cell. The at least one first and second configurations are transmitted for a same communication function (or functionality). Then, the UE applies the at least one first configuration instead of the at least one second configuration, if a capability of the UE is complied with the at least one first configuration. The UE applies the at least one second configuration instead of the at least one first configuration, if the capability of the UE is not complied with the at least one first configuration. That is, the UE applies the at least one first or second configuration according to the capability of the UE.

Realization of the present invention is not limited to the above description. Examples below may be applied to the process 50.

In one example, the at least one first configuration may include at least one first cell barred information, and the at least one second configuration may include at least one second cell barred information. In one example, the at least one first configuration may include at least one first access barring configuration, and the at least one second configuration may include at least one second access barring configuration. In one example, the at least one first configuration may include at least one first RA configuration, and the at least one second configuration may include at least one second RA configuration. In one example, the at least one first configuration may include at least one first common radio resource configuration, and the at least one second configuration may include at least one second common radio resource configuration. In one example, the UE applies the at least one first configuration, if the UE is not a low complexity UE (e.g., a bandwidth reduced low complexity UE) and is not configured to apply at least one EC SIB. The UE may configure itself not to apply the at least one EC SIB, if a signal strength measured by the UE is above a threshold. In one example, the UE applies the at least one second configuration of the at least one EC SIB, if the UE is the low complexity UE (e.g., a bandwidth reduced low complexity UE), or is configured to apply at least one EC SIB. The UE may configure itself to apply the at least one EC SIB, if the signal strength measured by the UE is below a threshold.

Examples below may be applied to the processes above. The network may transmit legacy and EC SIBs on different channels. The first and second configurations may include a same parameter (e.g. field or IE) or different parameters, and the network may configure different values for the same parameter. The specific access may include an emergency, a mobile originating (MO) signaling, a MO data, a circuit-switched fallback (CSFB), a Multi Media Telephony (MMTEL) voice, or a MMTEL video. The at least one first RA configuration may include a PRACH-Config and a RACH-ConfigCommon IEs for transmission of a preamble, and the at least one second RA configuration may indicate a preamble and/or a resource (e.g., a frequency resource and/or a time resource) for transmission of repetitions of a preamble. The threshold may be predetermined or configured by the network.

Those skilled in the art should readily make combinations, modifications and/or alterations on the abovementioned description and examples. Any of the above mentioned processes may be compiled into the program code 214. The abovementioned description, steps and/or processes including suggested steps can be realized by means that could be hardware, software, firmware, an electronic system, or combination thereof. An example of the means may be the communication device 20.

To sum up, the present invention provides a device and a method for handling system information. Thus, the UE is able to receive and determine to apply which of one or more configurations received in different SIBs under one or more different conditions. As a result, the problem of which configuration should be applied to the same communication function is solved, when the UE receives the configurations for the same communication function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling applying system information, comprising:
    a storage unit for storing instructions of:
    receiving both legacy system information block (SIB) comprising at least one first configuration;
    and enhanced coverage (EC) SIB comprising at least one second configuration; and
    applying the at least one second configuration instead of the at least one first configuration, when the communication device is a low complexity communication device or is configured to apply the EC SIB instead of the legacy SIB, wherein the at least one first configuration and the at least one second configuration are for same communication function; and
    a processing means, coupled to the storage unit, configured to execute the instructions stored in the storage unit.

2. The communication device of claim 1, wherein the at least one first configuration comprises at least one first cell barred information, and the at least one second configuration comprises at least one second cell barred information; and
    the communication device determines that the cell is barred, when the at least one second cell barred information indicates that the cell is barred irrespective of that the at least one first cell barred information indicates that the cell is barred or not; and the communication device determines that the cell is not barred, when the at least one second cell barred information indicates that the cell is not barred irrespective of that the at least one first cell barred information indicates that the cell is barred or not.

3. The communication device of claim 1, wherein the at least one first configuration comprises at least one first access barring configuration, and the at least one second configuration comprises at least one second access barring configuration; and
    the instruction of applying the at least one second configuration comprises:
    performing a barring check for a specific access according to the at least one second access barring configuration, wherein the at least one first access barring configuration does not configure a access barring for the specific access and the at least one second access barring configuration configures the access barring for the specific access.

4. The communication device of claim 3, wherein the instruction of applying the at least one second configuration comprises:
    stopping performing a barring check for a specific access according to the at least one second access barring configuration, wherein the at least one first access barring configuration configures a access barring for the specific access and the at least second access barring configuration does not configure the access barring for the specific access.

5. The communication device of claim 1, wherein the at least one first configuration comprises at least one first random access configuration, and the at least one second configuration comprises at least one second random access configuration; and
    the instruction of applying the at least one second configuration comprises:
    performing a random access according to the at least one second random access configuration instead of the at least one first random access configuration.

6. The communication device of claim 1, wherein the communication device applies the at least one second configuration of the EC SIB instead of the at least one first configuration of the legacy SIB, when determining the legacy SIB as invalid.

7. The communication device of claim 6, wherein the communication device determines the legacy SIB as invalid, when the communication device does not receive the legacy SIB in or after a first time period.

8. A communication device for handling applying system information, comprising:
    a storage unit for storing instructions of:
    receiving both legacy system information block (SIB) comprising at least one first configuration;
    and enhanced coverage (EC) SIB comprising at least one second configuration; and
    applying the at least one first configuration instead of the at least one second configuration, when the communication device is not a low complexity communication device, wherein the at least one first configuration and the at least one second configuration are for same communication function; and
    a processing means, coupled to the storage unit, configured to execute the instructions stored in the storage unit.

9. The communication device of claim 8, wherein the at least one first configuration comprises at least one first cell barred information, and the at least one second configuration comprises at least one second cell barred information; and the communication device determines that the cell is barred, when the at least one first cell barred information indicates that the cell is barred irrespective of that the at least one second cell barred information indicates that the cell is barred or not; and the communication device determines that the cell is not barred, when the at least one first cell barred information indicates that the cell is not barred irrespective of that the at least one second cell barred information indicates that the cell is barred or not.

10. The communication device of claim 8, wherein the at least one first configuration comprises at least one first access barring configuration, and the at least one second configuration comprises at least one second access barring configuration; and the instruction of applying the at least one first configuration comprises:

performing a barring check for a specific access according to the at least one first access barring configuration, wherein the at least one second access barring configuration does not configure a access barring for the specific access and the at least one first access barring configuration configures the access barring for the specific access.

11. The communication device of claim 10, wherein the instruction of applying the at least one first configuration of the legacy SIB comprises:

stopping performing a barring check for a specific access according to the at least one first access barring configuration, wherein the at least one second access barring configuration configures a access barring for the specific access and the at least first access barring configuration does not configure the access barring for the specific access.

12. The communication device of claim 8, wherein the at least one first configuration comprises at least one first random access configuration, and the at least one second configuration comprises at least one second random access configuration; and the instruction of applying the at least one first configuration comprises:

performing a random access according to the at least one first random access configuration instead of the at least one second random access configuration.

13. The communication device of claim 8, wherein the communication device applies the at least one first configuration of the legacy SIB instead of the at least one second configuration of the EC SIB, when determining the EC SIB as invalid.

14. The communication device of claim 13, wherein the communication device determines the EC SIB as invalid, when the communication device does not receive the EC SIB in or after a second time period.

* * * * *